(12) United States Patent
Teh et al.

(10) Patent No.: US 6,482,461 B1
(45) Date of Patent: Nov. 19, 2002

(54) PROCESS OF PREPARING FLAVORED NOODLES

(75) Inventors: Shiok Guat Teh, Singapore (SG); Mary Bridget Sarsfield, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/714,989

(22) Filed: Nov. 20, 2000

(30) Foreign Application Priority Data

Jun. 16, 1998 (SG) .............................................. 9801421
Jun. 8, 1999 (WO) ....................................... EP99/03932

(51) Int. Cl.⁷ ................................................. A23L 1/16
(52) U.S. Cl. ...................... 426/557; 426/293; 426/302; 426/451
(58) Field of Search ................................. 426/557, 451, 426/302, 293, 650, 651, 653

(56) References Cited

U.S. PATENT DOCUMENTS

| | | | | |
|---|---|---|---|---|
| 4,178,393 A | * | 12/1979 | Gregersen | 426/557 |
| 4,769,247 A | * | 9/1988 | Rothenberg et al. | 426/557 |
| 5,211,977 A | | 5/1993 | Hauser et al. | 426/557 |
| 5,229,156 A | * | 7/1993 | Yokomizo et al. | 426/533 |
| 5,436,015 A | | 7/1995 | Patterson et al. | 426/94 |
| 5,780,091 A | * | 7/1998 | Cassetta et al. | 426/557 |
| 5,916,619 A | * | 6/1999 | Miyazaki et al. | 426/557 |

FOREIGN PATENT DOCUMENTS

| | | |
|---|---|---|
| EP | 0 705 541 | 10/1995 |
| JP | 500046 | 1/1993 |
| JP | 9248147 | 9/1997 |

* cited by examiner

Primary Examiner—Lien Tran
(74) Attorney, Agent, or Firm—Winston & Strawn

(57) ABSTRACT

A method of producing flavored noodles. The method involves preheating flavor ingredients to cause a partial flavor reaction to occur and than adding the preheated flavor ingredients to the dough ingredients or applying them to the dough sheets and then steaming the dough, frying or air drying the dough, and cooling the dough. The noodles prepared by the process have a savory flavor.

12 Claims, No Drawings

PROCESS OF PREPARING FLAVORED NOODLES

CROSS REFERENCE TO RELATED APPLICATIONS

This application claims priority to PCT Application No. PCT/EP99/03932, filed Jun. 8, 1999, now pending.

FIELD OF THE INVENTION

The present invention relates to the production of flavored noodles and a method of incorporating a savory flavor into the noodles.

BACKGROUND OF THE INVENTION

Instant noodles typically contain a sachet within the noodle package that includes seasonings in a paste or dehydrated form comprising various flavor ingredients. These flavor ingredients may include sources of peptides and amino acids in the form of biologically hydrolyzed plant protein such as soya sauce, yeast extract, cysteine, dextrose, combined with meat or vegetable extracts; fats; modified starches; particulate fried garnishes such as shallot, onions, garlic, or chilli; flavored oil; a liquid seasoning such as soya sauce; powdered seasonings, spices, flavors; and the like. The ingredients of the noodle seasoning are kept separate from the noodles until the noodles are ready to be consumed. When the noodles are prepared for consumption the consumer opens the sachet, adds the contents of the sachet to the noodles, and then either boils the noodle and the contents of the sachet in water or adds boiling water to the noodle and the contents of the sachets.

Incorporating the flavor ingredients in the sachet, however, is very expensive. If the flavor ingredients are added to the dough, however, it is usually necessary to add more than the amount required for a good taste since significant loss of flavor ingredients are incurred during heating and processing treatments. In addition, after steaming and drying of the noodles, the flavor of the noodles is often not what is desired. Thus, there is a need for improved methods for flavoring noodles.

SUMMARY OF THE INVENTION

The invention relates to a process for preparing flavored noodles that develops a desirable savory flavor. The process involves the steps of blending flour and water to form a dough, sheeting the dough to form dough sheets, slitting the dough sheets to form strips of dough having a width, steaming the strips to gelatinize starch in the dough and provide gelatinized strips, frying or air drying the gelatinized strips to provide noodles, cooling the noodles, and flavoring the dough by adding preheated flavor ingredients to the dough ingredients or applying preheated flavor ingredients to the surface of the dough sheets, wherein the preheated flavor ingredients comprise flavor ingredients that have been preheated at a temperature of from 60° C. to 100° C. for a period of from 10 to 90 minutes.

The preheated flavor ingredients may be one or more of peptides, amino acids, yeast extract, cysteine, thiamine, dextrose, xylose, meat extracts, vegetable extracts, fat, or flavored oil. The preheated flavor ingredient may also be soya sauce. The preheated flavor ingredients may be present in an amount of from 0.1 to 5 percent by weight of the dough. The preheated flavor ingredient may be added to the dough ingredients or applied to the surface of the dough sheets in the form of a solution or dispersion. The preheated flavor ingredients may be applied between two dough sheets.

The flavor ingredient may be heated at a temperature of from 80° C. to 98° C. to produce the preheated flavor ingredients. The flavor ingredient may be heated for 15 to 60 minutes to produce the preheated flavor ingredient.

The preheated flavor ingredients may be added to the dough or applied to the surface of the dough sheets as an aqueous solution, suspension, or dispersion having a water content of from 50 to 70 percent.

The strips may be steamed at atmospheric pressure and a temperature from 85° C. to 100° C. for from 1 to 5 minutes. The gelatinized strips may be fried at a temperature of from 125° C. to 170° C. for 20 to 100 seconds or the gelatinized strips may be air dried at a temperature of from 85° C. to 200° C. for 5 to 30 minutes.

The invention also relates to a dough comprising flour, water, and preheated flavor ingredients described herein.

DETAILED DESCRIPTION OF THE PREFERRED EMBODIMENTS

We have unexpectedly found that by preheating flavor ingredients to cause a partial flavor reaction to occur and than adding the preheated flavor ingredients to dough ingredients or applying them to dough sheets, a desirable savory flavor develops during the steaming and frying stages used in the typical noodle manufacturing processes. By applying the flavor ingredients on the dough sheets, the flavor is not diluted by the dough material and, thus, is stronger than if the flavor ingredients were added to the dough.

The present invention provides a process for preparing flavored noodles which comprises blending flour and water to form a dough, sheeting the dough to form dough sheets, slitting the dough sheets into strips of noodles of a desired width, steaming the noodles to gelatinise the starch, then frying or air drying the noodles and cooling the fried or air dried noodles. The flavor ingredients are preheated at a temperature of from 60° C. to 100° C. for a period of from 10 to 90 minutes and the preheated flavor ingredients are added to the dough ingredients or applied to the dough sheets.

The process of the present invention is applicable for fried noodles, soakable fried noodles, or air dried noodles.

The flour is conveniently durum or wheat flour and is usually present in an amount of from 70 to 85% by weight based on the total weight of the dough, depending on the variety and the particle size. The amount of water mixed with the flour is typically from 15 to 30% by weight based on the total weight of the dough. The temperature of the water mixed with the flour may be from 5° to 30° C. and preferably from 10° C. to 25° C. The water may be acid or alkaline, preferably the pH is from 6 to 7. The dough is conveniently mixed for about 5 to 30 minutes.

Advantageously, the dough may contain other conventional noodle ingredients such as salt in an amount up to 2%, sodium carbonate in an amount up to 0.5%, potassium carbonate in an amount up to 0.5%, wheat gluten in an amount up to 10%, whole egg or egg yolk in an amount up to 5%, sodium hexametaphosphate in an amount up to 0.5%, carboxymethylcellulose in an amount up to 0.5%, and glyceryl monostearate in an amount up to 2%. All amounts being given by weight based on the total weight of the noodle dough. It is to be understood that wheat gluten, eggs, and glyceryl monostearate are optional ingredients in the dry mix and are not essential in the production of the noodle. It is also possible to add propylene glycol alginate to the dry ingredient mix to obtain a noodle with an elastic and firm texture, preferably the propylene glycol alginate is present in an amount of from 0.01 to 1.0% by weight based on the weight of the noodle dough.

The sheeting of the dough may be carried out by conventional methods, for example, by kneading and rolling into sheets or by laminating.

The preheated flavor ingredients added to the dough ingredients or applied to the dough sheets may be, for instance, a source of peptides and amino acids in the form of biologically hydrolyzed plant protein such as soya sauce or wheat gluten sauce, yeast extract, cysteine, thiamine, dextrose, xylose, meat or vegetable extract, fat, or flavored oil.

The amount of preheated flavor ingredient added to the dough ingredients or applied to the dough sheets may be from 0.1 to 5%, preferably from 0.25 to 3%, and more preferably from 0.4 to 2.5% by weight based on the total weight of the dough sheets.

The preheated flavor ingredients are preferably added to the dough ingredients or applied to the dough sheets in the form of a solution, suspension, or dispersion, e.g., in water where the moisture content may be from 50 to 70% and preferably from 65 to 75% by weight. The preheated flavor ingredient may conveniently be applied by immersion or spraying. When the preheated flavor ingredient is applied to the dough sheets it is preferably applied between two dough sheets.

The preheating of the flavour ingredients is preferably carried out at a temperature of from 80° C. to 98° C. and more preferably from 85° C. to 95° C. for a period of from 15 to 60 minutes. Longer periods of time conveniently being used at lower temperatures. The preheating is conveniently carried out in aqueous suspension.

The dough sheets are slit into strips of noodles preferably having a width of from 1 to 1.5 mm.

Steaming the noodles may be carried out using saturated steam or steam at atmospheric condition, e.g., at a temperature from 85° C. to 100° C., preferably from 95° C. to 100° C. for a period of from 1 to 5 minutes, preferably from 1.5 to 3.5 minutes. The steaming cooks or gelatinises at least part of the surface of the noodles, e.g., at least 50% and preferably substantially all of the surface of the noodles. After steaming, the noodles may be folded to fit a mold of a desired size.

Frying the steamed noodles to give fried noodles may be performed in a fryer at a temperature of from 125° C. to 170° C. and preferably from 135° C. to 160° C. The duration of frying may be from 20 to 100 seconds and is preferably from 40 to 80 seconds. One unexpected advantage of frying the noodles is that, during the flying process, new or different flavor notes are developed from the preheated partially reacted flavor ingredients.

Air drying of the steamed noodles to give air dried noodles may be performed with a dryer, such as a belt dryer or an impingement dryer for a period of from 5 to 30 minutes, preferably from 10 to 20 minutes. The drying temperature maybe from 85° C. to 200° C. and preferably is from 125° C. to 175° C.

Finally, the fried or air dried noodles are cooled to a temperature below 40° C. and then packaged.

Optionally, the noodle package may also include a separate sachet containing a seasoning. By preparing tie noodles according to the process of this invention, wherein preheated flavor ingredients are added to the dough ingredients or applied to the dough sheets, it is possible to reduce the amount of flavor included in the separate sachet of seasoning. For example, the sachet need only contain solid flavoring ingredients such as salt, pepper, chilli, and the like.

In the absence of a seasoning in a separate sachet, it is possible to consume the flavored noodles as a dry snack.

The noodles may be prepared for consumption by either boiling in water for a few minutes, e.g., 1 to 5 minutes or by soaking in boiled water for a few minutes, e.g., 1 to 5 minutes.

EXAMPLES

The invention is further defined by reference to the following examples describing in detail the preparation of the noodles of the invention. The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. Parts and percentages are expressed by weight.

Example 1

A dough mixture is prepared from the following ingredients:

| Ingredient | Amount |
|---|---|
| Ruman Api Flour | 78.45 parts |
| Salt | 1.38 parts |
| Sodium carbonate | 0.04 parts |
| Potassium carbonate | 0.05 parts |
| Sodium Hexametaphosphate | 0.07 parts |
| CMC | 0.14 parts |
| Deionised water | 19.87 parts |

2 parts of flavor ingredients containing wheat gluten sauce powder, cysteine, and dextrose were preheated at 95° C. for 30 minutes. An aqueous dispersion of the preheated flavor ingredients was prepared and added to the dough ingredients. The above dough mixture and the aqueous dispersion of the flavor ingredients were mixed in a Fuji Horizontal Mixer for 15 to 20 minutes and the dough was sheeted to a thickness of about 5 mm. The dough sheets were reduced in stages to a thickness of 3 mm, 2 mm, and 1 mm; cut to the desired length for a target weight of 80 to 85 g; and slit with a Kiriha No. 26 Slitter to give noodles having a width of 1.15 mm. The noodles were then steamed at 100° C. with saturated steam for 120 seconds, folded to fit a mold of 110×110×25 mm, fried in a fryer at 132° C. for 50 seconds, air cooled to less than 40° C., and packaged. A seasoning containing salt, pepper, and chilli was sealed in a sachet and placed in the noodle package.

The noodles were prepared for consumption by boiling in 420 ml of water for 2 to 3 minutes. The resulting cooked noodles had a very desirable savory taste.

Example 2

A procedure similar to that described in Example 1 was followed except that the folded steamed noodles were air dried for 5 minutes at 150° C., instead of being fried, before being air cooled and packaged. The noodles were prepared for consumption by adding the noodles and seasoning to 450 ml of boiled water, cooking for 3 minutes with occasional stirring, removing from the heat, and allowing them to stand for 1 minute before tasting. The noodles had a very desirable savory taste.

What is claimed is:

1. A process of preparing flavored noodles comprising:

blending flour and water to form a dough;

sheeting the dough to form dough sheets;

preheating flavor ingredients at a temperature of from 60° C. to 100° C. for period of from 10 to 90 minutes to form preheated flavor ingredients;

flavoring the dough by adding the preheated flavor ingredients to the dough before said dough is sheeted, or by applying the preheated flavor ingredients to a surface of the dough sheet after said dough is sheeted, slitting the dough sheets to form strips of dough having a width;

steaming the strips to gelatinize starch in the dough and provide gelatinized strips;

frying or air drying the gelatinized strips to provide noodles; and cooling the strips to obtain flavored noodles.

2. The process of claim 1, wherein the preheated flavor ingredients comprise one or more of peptides, amino acids, yeast extract, cysteine, thiamine, dextrose, xylose, meat extracts, vegetable extracts, fat, and flavored oil.

3. The process of claim 1, wherein the preheated flavor ingredients comprise soya sauce.

4. The process of claim 1, wherein the preheated flavor ingredients are present in an amount of from 0.1 to 5 percent by weight of the dough.

5. The process of claim 1, wherein the preheated flavor ingredients are added to the dough or applied to the surface of the dough sheets in the form of a solution or dispersion.

6. The process of claim 1, wherein the preheated flavor ingredients are applied between two dough sheets.

7. The process of claim 1, wherein the flavor ingredient are heated at a temperature of from 80° C. to 98° C.

8. The process of claim 1, wherein the flavor ingredients are heated for 15 to 60 minutes.

9. The process of claim 1, wherein the preheated flavor ingredients are added to the dough or applied to the surface of the dough sheets as an aqueous solution, suspension, or dispersion having a water content of from 50 to 70 percent.

10. The process of claim 1, wherein steaming the strips is done with steam at atmospheric pressure and a temperature from 85° C. to 100° C. for from 1 to 5 minutes.

11. The process of claim 1, wherein the gelatinized strips are fried at a temperature of from 125° C. to 170° C. for 20 to 100 seconds.

12. The process of claim 1, wherein the gelatinized strips are air dried at a temperature of from 85° C. to 200° C. for 5 to 30 minutes.

* * * * *

UNITED STATES PATENT AND TRADEMARK OFFICE
CERTIFICATE OF CORRECTION

PATENT NO. : 6,482,461 B1
DATED : November 19, 2002
INVENTOR(S) : Teh et al.

It is certified that error appears in the above-identified patent and that said Letters Patent is hereby corrected as shown below:

<u>Title page,</u>
Insert the following section:

-- Related U.S. Application Data
-- [63] Continuation of application No. PCT/EP99/03932 filed on June 8, 1999. --.

Item [30], Foreign Application Priority Data, delete "Jun. 8, 1999 (WO) ... EP99/03932".

<u>Column 6,</u>
Line 11, change "ingredient" to -- ingredients --.

Signed and Sealed this

Thirtieth Day of September, 2003

JAMES E. ROGAN
*Director of the United States Patent and Trademark Office*